Patented Aug. 16, 1949

2,479,382

UNITED STATES PATENT OFFICE 2,479,382

EMULSIFIER AND EMULSIFIED HAIR-WAVING COMPOSITION

Harry W. Mace, Glendale, Calif., assignor, by mesne assignments, to Samuel O. Ronk and Louise R. Hunter No Drawing. Application December 18, 1945, Serial No. 635,782

20 Claims. (Cl. 167—87.1)

This invention relates to emulsifying bases and particularly to improved emulsifying bases suitable for the preparation of so-called "cold waving cream" for permanent waving of the hair.

One object of this invention is to provide an emulsifying base which will readily form a substantially permanent creamy homogeneous emulsion of the oil in water type when oils, lanolin, and other desirable oily components are to be incorporated into a "cold waving cream" to be employed for permanent waving.

Another object of my invention is to provide an emulsifying base which will form and maintain permanent suspensions containing larger amounts of ammonium thioglycollate in cold waving creams than it has been heretobefore possible to use.

A further object of my invention is to provide an emulsifying base that will form creamy emulsions of the oil in water type which are not affected by the subsequent addition of keratin to the preparation.

Many of the present types of so-called "cold waving creams" used for the permanent waving of the hair show a marked tendency to separate into their component phases when sufficient percentages of oils or oily type materials are added to the mixture. It has been further observed that many of the present types of emulsions prove to be quite unstable when it is attempted to incorporate into the emulsions suitable percentages of materials such as ammonium thioglycollate, keratin, and other materials that are highly desirable in such preparations.

My invention overcomes the above difficulties by forming and maintaining homogeneous emulsions of the oil in water type when employing large amount of mineral oil, other oily materials, ammonium thioglycollate, lanolin, and keratin in the emulsions.

I have discovered that a highly efficient "emulsifying base" may be prepared by employing a combination of an oil soluble emulsifying agent, such as sorbitan monooleate, and a water soluble emulsifying agent, such as sorbitan monooleate polyoxyalkylene derivative or other suitable emulsifying agent, for example, the soap of certain organic amines, and adding to these substances a normally liquid chlorinated paraffin hydrocarbon selected from the group having from about 13 to about 30 carbon atoms per molecule and including paraffin waxes, in which the chlorine content varies between about 10% and about 70% by weight depending on the compound selected and the desired specific gravity of the final solution. For example, I may use a chlorinated paraffin wax or paraffin hydrocarbon having in the order of 25 or 26 carbon atoms and containing between about 40% and 45% of chlorine. A preferred chlorinated paraffin compound is one containing about 26 carbon atoms and approximately 43% chlorine by weight and having a specific gravity of about 1.16 to 1.18. As long as the material is a liquid chlorinated hydrocarbon even chlorinated hydrocarbons of lower chlorine content have some efficacy, for example, those containing about 10% chlorine. In the case of the paraffin waxes enough chlorine is used to liquefy the wax for example around 40% by weight. Another preferred chlorinated paraffin hydrocarbon is one having about 13 carbon atoms and about 57% by weight of chlorine.

Normally solid chlorinated paraffin hydrocarbon may be also employed if desired in cases where the amount of combination of oils and emulsifier or emulsifiers is sufficient to dissolve the solid chlorinated paraffin and produce a fluid. The addition of the chlorinated paraffin to the emulsifying agents greatly increases the ease with which substantially permanent emulsions of difficultly emulsifiable materials, highly desirable in the finished product, may be compounded.

The emulsifying agents that have been found particularly effective in combination with the chlorinated paraffin possess the following properties:

1. The hydrophylic or water soluble portion of the emulsifying agent derives its affinity for water from groups other than hydroxyl groups;
2. The water soluble groups or radicals also have some oil solubility;
3. The hydrophobic or oil soluble portion of the emulsifying agents is highly soluble in fats and oils.

In case it is necessary to obtain this combination of properties by employing more than one emulsifier, then the respective emulsifying agents should be soluble in each other.

A great number of the difficultly emulsifiable oil-like materials are readily soluble in chlorinated paraffins of the character described, and these chlorinated paraffins emulsify easily with water forming oil in water emulsions especially when the emulsifying agent is a combination of sorbitan monooleate and sorbitan monooleate polyoxyalkylene derivative. Other suitable emulsifying agents that may be employed for the purpose are the aliphatic organic amine soaps of certain fatty acids capable of producing emulsification, for example, decyl amine oleate, triethanol amine oleate, butyl amine oleate, diethyl hexylamine oleate, amino ethyl ethanol amine oleate, etc. The fatty acid soaps of the aliphatic amines capable of producing emulsification are usable for purpose of this invention. These include the oleates, palmitates, stearates, etc., of the suitable aliphatic amines. The preferred form of fatty acid soaps of the aliphatic amines capable of producing emulsions are the oleates. When the difficultly emulsifiable oil-like materials are in solution with the chlorinated paraffins, they are also easily emulsified into substantially permanent creamy oil in water type emulsions.

Since the specific gravity of the chlorinated paraffin is generally greater than 1.000, while that of the water phase is approximately between 1.000 and 1.100, it is possible to adjust the specific gravity of the "emulsifier base," that is, the combination of chlorinated paraffin, sorbitan monooleate and sorbitan monooleate polyoxyalkylene derivative or other emulsifying agent, to approximately that of the water phase to insure more permanent emulsions. This is usually done by adding mineral oil such as crystal oil, oil-like organic esters of dicarboxylic acids having satisfactory physical and physiological properties such as dibutyl sebacate, non-drying vegetable oils such as olive and castor oils, or a combination of these oily materials in quantities sufficient to adjust the specific gravity of the "emulsifying base." The gravity of this mixture should not be below 0.9 and should not substantially exceed the gravity of the water phase. The mixture of oil or oily material and the "emulsifying base" is hereafter referred to as the "oil base" portion of the emulsion. Preferred animal fats such as lanolin can also be easily incorporated into the "oil base." These substances help to form a product that is better suited for use in preparations of the stated kind.

The addition of ammonium thioglycollate is decidedly advantageous where it is desired to obtain high reactivity of the permanent waving emulsion without injury to the hair shaft. This ingredient, however, has the undesirable property of causing many of the emulsions, formed by emulsifying bases heretofore used to break when the amount of ammonium thioglycollate added is large enough to materially reduce the waving time. Therefore, its use in most emulsions has heretofore been limited to about 5% by weight of the total emulsion. When the emulsifying base of this invention is used to produce an emulsion, the amount of ammonium thioglycollate may be increased to 8% or more based on the weight of the total emulsion.

It has been found, however, that the maximum beneficial result is obtained when about 8% by weight of ammonium thioglycollate is employed. The effectiveness of the ammonium thioglycollate is further increased by adjusting the pH of the solution to a value between 9.0 and 9.5. This may be done by adding ammonium hydroxide. The improved reaction caused by the addition of ammonium thioglycollate to the emulsion is probably due to the fact that ammonium thioglycollate temporarily breaks the cystine bond in the hair protein without permanently injuring the hair shaft. When this bond is temporarily broken the hair easily takes the wave.

The speed of reactivity may be increased through the use of strong alkaline solutions. These substances, however, usually break the peptide linkage of the hair protein which results in its permanent injury. The use of strong alkaline solutions, which permit the use of emulsifying bases heretofore used, should therefore be avoided.

The principal constituents of the compositions produced by this invention are those that have been described above. They may be used in various proportions as will be apparent from the examples in the following table which sets forth proportions on a substantially water-free basis for the various emulsions indicated as "light," "medium," and "heavy." This table includes the use of dispersing agents. The amount of ammonium thioglycollate indicated under the heading of "Parts" is, in each instance, the amount necessary to constitute 8% by weight of the final emulsion, and the same is true of the "medium," "heavy," and "light" compositions under the "Percentage" heading. Since, in some instances, the ammonium thioglycollate proportions may be reduced to smaller percentages, the last three columns represent respectively 4% by weight of this material for a "medium" emulsion, 4% by weight for a "heavy" emulsion and 2½% by weight for a "heavy" emulsion.

One may employ a solution of borax and gelatin in water to act as dispersing agents. These materials, however, may be omitted if desired.

|  | Based on 8% by Weight Ammonium Thioglycollate in the Total Emulsion | | | | | | | Based on Ammonium Thioglycollate in the Total Emulsion | | |
|---|---|---|---|---|---|---|---|---|---|---|
|  | | | | | | | | 4% | 4% | 2½% (by weight) |
|  | Parts by Weight | | | Pounds, Medium | Approx. Percentage | | | Approx. Percentage | | |
|  | Light | Heavy | Medium | | Light | Heavy | Medium | Medium | Heavy | Heavy |
| Oil Base: | | | | | | | | | | |
| Mineral Oil | 0 | 6 | 2 | 3½ | 0 | 6 | 3 | 4 | 8 | 9 |
| Lanolin | 0 | 3 | 1 | 1½ | 0 | 3 | 1½ | 2 | 4 | 4.5 |
| Emulsion Base: | | | | | | | | | | |
| Chlorinated paraffin (25 C atoms, 43—Cl) | 4 | 15 | 5 | 8¾ | 6 | 16 | 7 | 10 | 8 | 9 |
| Sorbitan Monooleate | 4 | 7.5 | 5 | 8¾ | 6 | 7.5 | 7 | 10 | 10 | 11 |
| Sorbitan Monooleate Polyoxyalkylene deriv | 8 | 15 | 10 | 17½ | 12 | 16 | 14 | 20 | 20 | 22 |
| Dispersing Agents: | | | | | | | | | | |
| Gelatin | .5 | .5 | .5 | ⅞ | 0.7 | 0.5 | 0.7 | 1 | 0.7 | 0.75 |
| Borax | .5 | .5 | .5 | ⅞ | 0.7 | 0.5 | 0.7 | 1 | 0.7 | 0.75 |
| Ammonium Thioglycollate | 40 | 40 | 40 | 70 | 63 | 42 | 55 | 38 | 26 | 18 |
| Ammonia as NH₃ | 8 | 8 | 8 | 14 | 12 | 8 | 12 | 15 | 11 | 12 |
| Total constituents except water | 65 | 95.5 | 72 | 126 | 12 | 20 | 14 |  |  |  |
| Water | 430 | 404.5 | 428 | q. s. 100 gal. | 88 | 80 | 85 |  |  |  |

From a practical commercial standpoint based on the above table the limits in percentage on a substantially water-free basis are as follows:

| | Per cent |
|---|---|
| Chlorinated paraffin (26 carbon atoms and about 43% chlorine) | 6 to 22 |
| Sorbitan monooleate | 6 to 11 |
| Sorbitan monooleate polyoxyalkylene derivative | 12 to 22 |
| Mineral oil (or other oily material) | 0 to 9 |
| Lanolin | 0 to 5 |
| Ammonium thioglycollate | 18 to 65 |

This shows that the ratio of chlorinated paraffin hydrocarbon to sorbitan monooleate, to sorbitan monooleate polyoxyalkylene derivative may vary between the limits of 1:1:2 and 2:1:2.

The ammonium thioglycollate percentage range of about 18% to 65% (water-free basis) represents a range in the finished emulsion of about 2½% to 8% by weight.

The overall limits of the constituents present in the "oil base" to produce emulsions for various uses are approximately as follows:

| | Per cent by weight |
|---|---|
| Mineral oil | 0 to 40 |
| Lanolin | 0 to 20 |
| Chlorinated paraffin (as above) | 15 to 40 |
| Sorbitan monooleate | 25 to 12½ |
| Sorbitan monooleate polyoxyalkylene derivative | 50 to 25 |

Chlorinated paraffin hydrocarbons taken from the group of chlorinated paraffins having 13-30 carbon atoms and 10% to 70% by weight chlorine may be employed in the proportions of 15% to 40% by weight of the oil base. The desired specific gravity of the oil base determines the amount required.

When one of the above-described emulsifying amine soaps are substituted for the sorbitan compounds it will be employed in the amount of 10%-35% by weight of the oil base, a preferable amount being about 20%.

In preparing compositions of this invention, water is employed in appropriate proportions to yield the desired emulsions. For example, to the specific composition given in the above table amounting to 126 pounds of the constituents other than water, water is added in amount sufficient to bring the volume of the finished emulsion to one hundred gallons. This composition produces a "medium" type of emulsion in which the water content is approximately 85% by weight. To produce a "heavy" emulsion of the indicated constitution, about 80% by weight of water will be ordinarily employed, and to produce a "light" type of emulsion about 88% or 90% by weight of water will be used.

The emulsion is compounded in the following manner: The oily material, such as mineral oil, lanolin, or both, and the chlorinated paraffin are mixed together and warmed to about 50° C. When the solution is homogeneous the required amounts of sorbitan monooleate and sorbitan monooleate polyoxyalkylene derivative, or other emulsifier, or combination of emulsifiers, are added. This forms the "oil base."

In case gelatin and borax are to be added as dispersing agents, these ingredients are dissolved in part of the water (25 gallons in the example) and heated to about 45° C. The "oil base" is then added to the heated solution and stirred until the entire mixture has cooled to room temperature. The ammonium thioglycollate is dissolved in the remainder of the water, and the pH is adjusted to a value between 9.0 and 9.5 with ammonium hydroxide. This solution is then added to the above cooled mixture and the entire mixture is agitated until it is thoroughly mixed. In some cases it is desirable to add a decolorizing agent such as sodium hydrosulfite. This is preferably introduced with the final addition of water, having been previously dissolved therein. Perfume may be also added if desired.

It is often desirable to add keratin to hair waving creams because it improves the effect of the hair waving solution. However, it is customary to disperse keratin in a dilute aqueous sodium hydroxide solution, which solution ordinarily seriously interferes with the emulsions to which it is added and causes phase separation. In emulsions made according to this invention, the emulsifying base takes care of this difficulty with the result that it is possible to produce stable emulsions containing keratin in a dilute aqueous sodium hydroxide solution.

Under some conditions it may be desirable to use more compatible oil-like substitutes in place of the mineral oil above-mentioned. Substances of this type that may be employed are oil-like organic esters of dicarboxylic acids having suitable physical and physiological properties. An example of such a material is dibutyl sebacate. This type of material would be substituted for mineral oil, either wholly or in part, when greater compatibility than that exhibited by mineral oil is desired.

The chlorinated hydrocarbons described readily enter into the emulsion and assist the sorbitan monooleate and the sorbitan monooleate polyoxyalkylene derivative or other emulsifying agent in bringing the oils, other oily materials and lanolin into the emulsion when the latter is used, as is preferably done. Apparently, it is the chlorinated paraffin hydrocarbon which makes possible the use of larger proportions of ammonium thioglycollate than usual.

The combination of the chlorinated hydrocarbon, oil soluble and water soluble emulsifying agents, or other suitable emulsifying agent also seems to insure a homogeneous dispersion of the keratin solution in the emulsion.

The addition of chlorinated paraffins, as stated above, greatly increases the ease with which substantially permanent emulsions of difficultly emulsifiable materials may be produced. This is probably due to the chemical inertness of the chlorinated paraffins toward reactive electrolytes such as, for example, ammonium thioglycollate; to their compatibility with the types of oils usually employed; and to the fact that because the chlorinated paraffins have a high specific gravity it is possible to compensate by proper selection of the amount or type or both of chlorinated paraffins, for the low specific gravity of desirable oils, thus permitting adjustment of the gravity of the oil phase to approximately that of the water phase.

I claim:

1. An emulsifying base for hair waving compositions, said base comprising a normally liquid chlorinated paraffin hydrocarbon containing at least about thirteen carbon atoms per molecule, sorbitan monooleate, and sorbitan monooleate polyoxyalkylene derivative.

2. An emulsifying base as in claim 1 wherein the chlorinated paraffin hydrocarbon is a chlorinated wax.

3. An emulsifying base according to claim 1 wherein the chlorinated paraffin hydrocarbon is present in the order of 15 to 40 parts by weight, the sorbitan monooleate is present in the order of 12½ to 25 parts by weight, and the sorbitan monooleate polyoxyalkylene derivative is present in the order of 25 to 50 parts by weight.

4. A hair waving composition comprising the emulsifying base of claim 1 and a substantial proportion of ammonium thioglycollate.

5. A hair waving composition comprising the emulsifying base of claim 1 and a quantity of ammonium thioglycollate at least approximately equal to the quantity of said base.

6. An oil base for hair waving compositions comprising a normally liquid chlorinated paraffin hydrocarbon having about 13 carbon atoms per molecule, an oil soluble emulsifier in the form of sorbitan monooleate, a water soluble emulsifier in the form of sorbitan monooleate polyoxyalkylene derivative and an unchlorinated emulsifiable "oily material."

7. An oil base as in claim 6 wherein the chlorinated hydrocarbon contains in the order of 10% to 70% of chlorine and has between about 13 and about 30 carbon atoms per molecule.

8. A hair waving composition comprising an oil base as in claim 6 and ammonium thioglycollate approximating the combined content of the other named constituents.

9. An oil base for a hair waving composition comprising an oil selected from the class consisting of mineral oil and non-drying vegetable oils in an amount up to about 40% by weight, lanolin in an amount up to about 20% by weight, a normally liquid chlorinated paraffin hydrocarbon containing at least about 10% chlorine and at least 13 carbon atoms per molecule in amount from about 15% to about 40% by weight, an oil soluble emulsifier in amount from about 12½ to about 25% by weight, and a water soluble emulsifier in amount from about 25% to about 50% by weight.

10. A hair waving composition comprising the oil base of claim 9, at least an approximately equal amount of ammonium thioglycollate and water totaling about 80% to about 90% by weight of the total composition.

11. An oil base for a hair waving composition comprising an oily material in amount up to about 60% by weight and selected from the class consisting of mineral oil, non-drying vegetable oils and lanolin, a chlorinated paraffin hydrocarbon containing about 13 to 30 carbon atoms per molecule and about 10% to 70% by weight chlorine in amount between about 15% to about 40% by weight, and an emulsifier in an amount between 10% and 75% weight.

12. An oil base as in claim 11 wherein the emulsifier is an empulsifying fatty acid aliphatic amine soap.

13. An oil base as in claim 11 wherein the emulsifier is an emulsifying aliphatic amine oleate.

14. An oil base as in claim 11 wherein the emulsifier is about 20% by weight of decyl amine oleate.

15. A water emulsion comprising oily materials, a normally liquid chlorinated paraffin hydrocarbon containing at least 13 carbon atoms per molecule, an emulsifying agent, and in the order of 8% ammonium thioglycollate.

16. A water emulsion according to claim 15 containing a normally liquid mineral oil and lanolin.

17. A water emulsion comprising oily materials in emulsified form, a normally liquid chlorinated paraffin hydrocarbon containing in the order of 25 carbon atoms per molecule and between about 10% and about 70% of combined chlorine, an emulsifying agent, and about 8% of ammonium thioglycollate with excess ammonia to yield a pH between about 9.0 and 9.5.

18. A water emulsion as in claim 17 containing small percentages of keratin in sodium hydroxide solution.

19. A hair waving composition comprising the following base materials on a substantially water-free basis and in the following proportions: Mineral oil up to about 9% by weight, lanolin up to about 5% by weight, chlorinated paraffin having about 26 carbon atoms and about 43% chlorine by weight from about 6% to 22% by weight, sorbitan monooleate from about 6% to about 11% by weight; sorbitan monooleate polyoxyalkylene derivative from about 12% to about 22% by weight, ammonium thioglycollate from about 18% to about 65% by weight, ammonia as NH₃ from about 8% to about 15% by weight; and water in amount to constitute about 80% to 90% of the final emulsion, the above base materials forming the remainder.

20. A hair waving preparation comprising a normally liquid paraffin hydrocarbon containing at least thirteen carbon atoms per molecule and between about 10% and about 70% by weight of combined chlorine, an emulsifier and ammonium thioglycollate in an amount at least approximating the total amount of the chlorinated hydrocarbon and emulsifier.

HARRY W. MACE.

REFERENCES CITED

The following references are of record in the file of this patent:

UNITED STATES PATENTS

| Number | Name | Date |
|---|---|---|
| 1,933,021 | Maeder | Oct. 31, 1933 |
| 2,305,356 | Luckenbach | Dec. 15, 1942 |
| 2,310,687 | Friedman | Feb. 9, 1943 |
| 2,322,822 | Brown | June 29, 1943 |
| 2,326,233 | Leatherman | Aug. 10, 1943 |
| 2,380,166 | Griffin | July 10, 1945 |

OTHER REFERENCES

"Emulsions With Triethanolamine," p. 58, July 1943, 4th ed., Carbide and Carbon Chemicals Corp., New York. (Division 64.)

"Chlorowax," Diamond Alkali Co., Pittsburgh Pa., 24 page booklet, received 1946. (Division 64, Patent Office.)

Atlas "Spans and Tweens," Atlas Powder Co., Wilmington, Del., 18 page booklet, copyright 1942, 167–85W.

Conn. Agr. Exp. Station, Bulletin 460, May 1942, pages 448–450.